United States Patent
Fino

(10) Patent No.: US 8,819,577 B2
(45) Date of Patent: Aug. 26, 2014

(54) EMOTIONAL RATINGS OF DIGITAL ASSETS AND RELATED PROCESSING

(75) Inventor: Jorge S. Fino, San Jose, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 13/249,084

(22) Filed: Sep. 29, 2011

(65) Prior Publication Data

US 2013/0086519 A1 Apr. 4, 2013

(51) Int. Cl.
*G06F 13/00* (2006.01)
*G06F 15/00* (2006.01)
*G06F 17/30* (2006.01)

(52) U.S. Cl.
CPC ...... *G06F 17/30775* (2013.01); *G06F 17/3082* (2013.01)
USPC .......................................... 715/780; 715/771

(58) Field of Classification Search
CPC ................ G06F 17/30775; G06F 17/3082
USPC ............... 715/771, 810, 780, 763–765
See application file for complete search history.

(56) References Cited

U.S. PATENT DOCUMENTS

| | | | |
|---|---|---|---|
| 8,046,369 B2 * | 10/2011 | Martin et al. ................. | 707/748 |
| 8,161,411 B2 | 4/2012 | Robbin et al. | |
| 8,335,914 B2 * | 12/2012 | Crandall et al. .............. | 713/100 |
| 2004/0268451 A1 | 12/2004 | Robbin et al. | |
| 2010/0293492 A1 * | 11/2010 | Farsedakis ..................... | 715/771 |

OTHER PUBLICATIONS

"Last.fm—Listen to free music with internet radio and the largest music category ... " http://www.last.fm/help/faq, downloaded Sep. 20, 2011, 6 pages.

* cited by examiner

*Primary Examiner* — Kevin Nguyen
(74) *Attorney, Agent, or Firm* — Fish & Richardson P.C.

(57) ABSTRACT

Improved techniques are disclosed to associate emotions (or feelings) with digital assets, such as digital media assets. In one embodiment, a graphical user interface can be presented to assist a user in associating emotions or feelings with a digital asset (e.g., digital media asset). The emotions of a user can be graphically represented by images, such as icons. For example, by selecting one or more of the images or manipulating a user control in relation to the images, a user can associate (e.g., tag) emotions to a digital asset. Once digital assets are associated (e.g., tagged) with one or more emotions, operations (e.g., playlist creation, search, shuffle, etc.) can be performed based on emotions.

20 Claims, 13 Drawing Sheets

EMOTIONAL RATINGS OF DIGITAL ASSETS AND RELATED PROCESSING

BACKGROUND OF THE INVENTION

Today, digital assets (e.g., musical songs, movies, games, computer application programs) are readily available for purchase from online stores. Users (e.g., purchasers) of digital assets can be permitted to rate the digital assets, such as with a rating system. A common rating system permits user to rate songs from one (1) to five (5) stars (star ratings). Since songs are able to be rated, once rated, playlists are able to be automatically formed using the ratings applied to the songs. Besides star ratings, songs have also conventionally been tagged by associating words with the digital assets.

SUMMARY

Improved techniques are disclosed to associate emotions (or feelings) with digital assets, such as digital media assets. In one embodiment, a graphical user interface can be presented to assist a user in associating emotions or feelings with a digital asset (e.g., digital media asset). The emotions of a user can be graphically represented by images, such as icons. For example, by selecting one or more of the images or manipulating a user control in relation to the images, a user can associate (e.g., tag) emotions to a digital asset. Once digital assets are associated (e.g., tagged) with one or more emotions, operations can be performed based on emotions. In one embodiment, an operation that can be performed based on emotions is creation of a playlist. For example, a user can select one or more emotions, and then initiate creation of a playlist that include digital assets (e.g., songs) that are tagged with the selected one or more emotions. In another embodiment, an operation that can be performed based on emotions is shuffling a digital media collection. For example, a user can select one or more emotions, and then initiate shuffling of a digital media collection that include digital assets (e.g., songs) that are tagged with one or more emotions, such that the shuffled media collection is organized to prefer those digital media assets in the digital media collection that are tagged to match the selected one or more emotions. In still another embodiment, an operation that can be performed based on emotions is searching a digital library to locate digital assets matching one or more emotions.

Various aspects and advantages of the invention will become apparent from the following detailed description taken in conjunction with the accompanying drawings which illustrate, by way of example, the principles of the invention.

The invention can be implemented in numerous ways, including as a method, system, device, apparatus (including computer readable medium and graphical user interface). Several embodiments of the invention are discussed below.

As a method for rating digital media assets, one embodiment of the invention can, for example, include at least the acts of: identifying a particular media asset to be rated; presenting an emotion rating user interface on a display device; receiving at least one user selection via the emotion rating user interface to set an emotion rating for the particular media asset; and storing the emotion rating for the particular media asset.

As a non-transitory computer readable medium including at least computer program code stored thereon for rating digital media assets, the non-transitory computer readable medium can, for example, include at least: computer program code for identifying a particular media asset to be rated; computer program code for presenting an emotion rating user interface on a display device associated with the electronic device; computer program code for receiving at least one user selection via the emotion rating user interface to set an emotion rating for the particular media asset; and computer program code for storing, in a data storage of the electronic device, the emotion rating for the particular media asset.

As a method for creating a playlist of digital media assets suitable for playback on an electronic device, one embodiment of the invention can, for example, include at least: presenting a playlist creation user interface on a display device associated with the electronic device, the playlist creation user interface having selectable emotion icons; receiving one or more selections of the selectable emotion icons; receiving a request to create a playlist in accordance with the one or more selections of the selectable emotion icons; querying a media library to identify a set of digital media assets that correspond to the one or more selections of the selectable emotion icons; and forming the playlist from the identified set of digital media assets.

As a non-transitory computer readable medium including at least computer program code stored thereon for creating a playlist of digital media assets suitable for playback on an electronic device, one embodiment of the invention can, for example, include at least: computer program code for presenting a playlist creation user interface on a display device associated with the electronic device, the playlist creation user interface having selectable emotion icons; computer program code for receiving one or more selections of the selectable emotion icons; computer program code for receiving a request to create a playlist in accordance with the one or more selections of the selectable emotion icons; computer program code for querying a media library to identify a set of digital media assets that correspond to the one or more selections of the selectable emotion icons; and computer program code for forming the playlist from the identified set of digital media assets.

As a method for shuffling a media collection prior to subsequent playback of the media collection ay an electronic device, one embodiment of the invention can, for example, include at least: presenting a shuffle user interface on a display device associated with the electronic device, the shuffle user interface having a plurality of user-controllable emotion parameters; receiving a user input regarding at least one of the user-controlled emotion parameters; visually designating the at least one of the user-controlled emotion parameters; storing the at least one of the user-controlled emotion parameters; subsequently receiving a shuffle request; and shuffling the media collection to order the digital media assets biased in favor of those if the digital media assets that match the at least one of the user-controlled emotion parameters.

As a computer readable medium including at least computer program code stored thereon for shuffling a media collection prior to subsequent playback of the media collection ay an electronic device, one embodiment of the invention can, for example, include at least: computer program code for presenting a shuffle user interface on a display device associated with the electronic device, the shuffle user interface having a plurality of user-controllable emotion parameters; computer program code for receiving a user input regarding at least one of the user-controlled emotion parameters; computer program code for visually designating the at least one of the user-controlled emotion parameters; computer program code for storing the at least one of the user-controlled emotion parameters; computer program code for subsequently receiving a shuffle request; and computer program code for shuffling the media collection to order the digital media assets biased in favor of those if the digital media assets that match the at least one of the user-controlled emotion parameters.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Improved techniques are disclosed to associate emotions (or feelings) with digital assets, such as digital media assets. In one embodiment, a graphical user interface can be presented to assist a user in associating emotions or feelings with a digital asset (e.g., digital media asset). The emotions of a user can be graphically represented by images, such as icons. For example, by selecting one or more of the images or manipulating a user control in relation to the images, a user can associate (e.g., tag) emotions to a digital asset. Once digital assets are associated (e.g., tagged) with one or more emotions, operations can be performed based on emotions. In one embodiment, an operation that can be performed based on emotions is creation of a playlist. For example, a user can select one or more emotions, and then initiate creation of a playlist that include digital assets (e.g., songs) that are tagged with the selected one or more emotions. In another embodiment, an operation that can be performed based on emotions is shuffling a digital media collection. For example, a user can select one or more emotions, and then initiate shuffling of a digital media collection that include digital assets (e.g., songs) that are tagged with one or more emotions, such that the shuffled media collection is organized to prefer those digital media assets in the digital media collection that are tagged to match the selected one or more emotions. In still another embodiment, an operation that can be performed based on emotions is searching a digital library to locate digital assets matching one or more emotions.

The following detailed description is illustrative only, and is not intended to be in any way limiting. Other embodiments will readily suggest themselves to skilled persons having the benefit of this disclosure. Reference will now be made in detail to implementations as illustrated in the accompanying drawings. The same reference indicators will generally be used throughout the drawings and the following detailed description to refer to the same or like parts. It should be appreciated that the drawings are generally not drawn to scale, and at least some features of the drawings may have been exaggerated for ease of illustration.

Embodiments are discussed below with reference to FIGS. 1-12. However, those skilled in the art will readily appreciate that the detailed description given herein with respect to these figures is for explanatory purposes as the invention extends beyond these limited embodiments.

Figure 1:
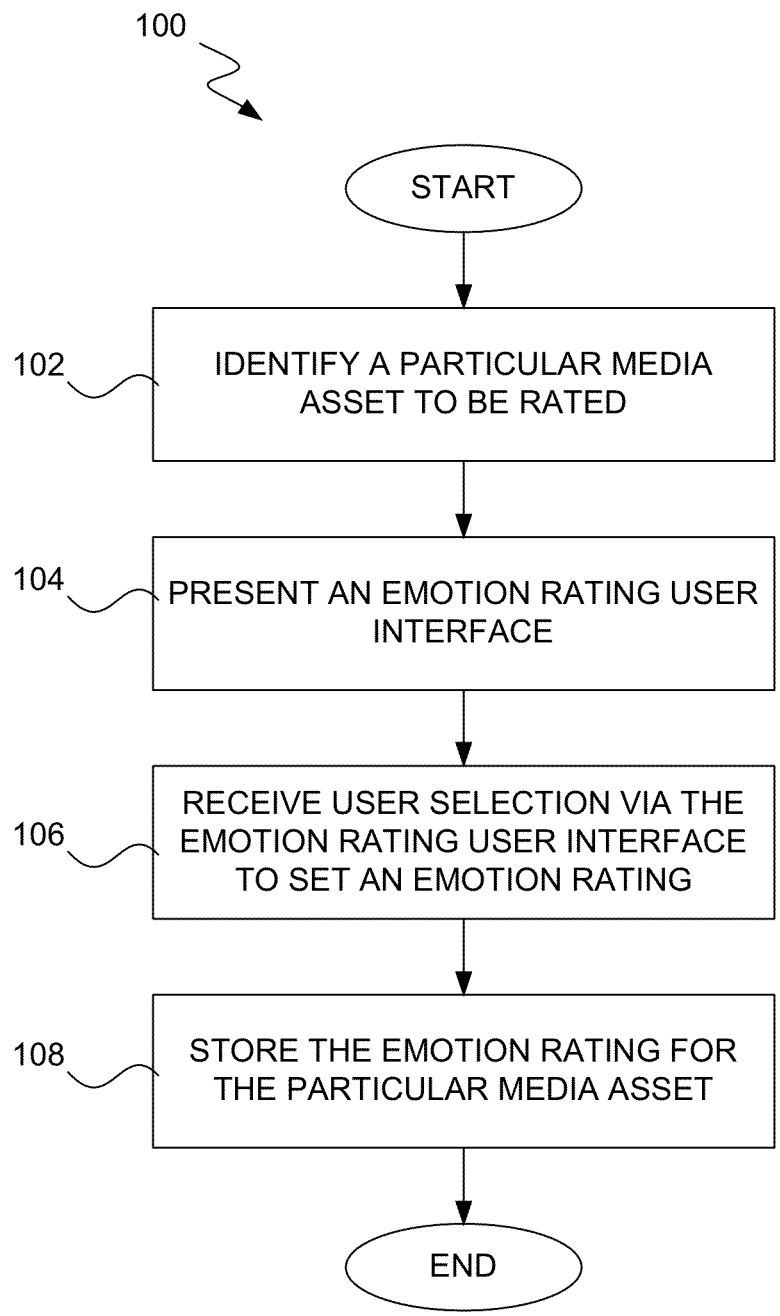
FIG. 1 is a flow diagram of an emotion rating process according to one embodiment.

FIG. 1 is a flow diagram of an emotion rating process 100 according to one embodiment. The emotion rating process 100 can be performed by an electronic device (e.g., computing device), such as a personal computer, notebook computer, tablet computer or handheld electronic device (e.g. multi-function handheld electronic device, such as a smart phone).

The emotion rating process 100 can identify 102 a particular media asset to be rated. Here, a user of the computing device can interact with the computing device in any of a variety of different ways to select the particular media asset to be rated. Next, an emotion rating user interface can be presented 104. For example, the emotion rating user interface can be presented 104 on a display device associated with the computing device. After the emotion rating user interface has been presented 104, a user selection can be received 106 via the emotion rating user interface. Here, the user selection with respect to the emotion rating user interface is for the purpose of setting an emotion rating for the particular media asset. The user selection can itself determine the emotion rating or can be used to influence an emotion rating. Thereafter, the emotion rating for the particular media asset can be stored 108 for subsequent use by the computing device or other electronic devices. For example, the emotion rating can be stored locally at the computing device and/or the emotion rating can be stored to a remote server. The emotion rating that has been established for a given user can be used exclusively by the user, can be shared with other users, or can be generally accessible by a media distribution system (e.g. online media store) for making use of aggregated emotion ratings for various digital media assets. Following the storage 108 of the emotion rating for the particular media asset, the emotion rating process 100 can end.

Figure 2A:
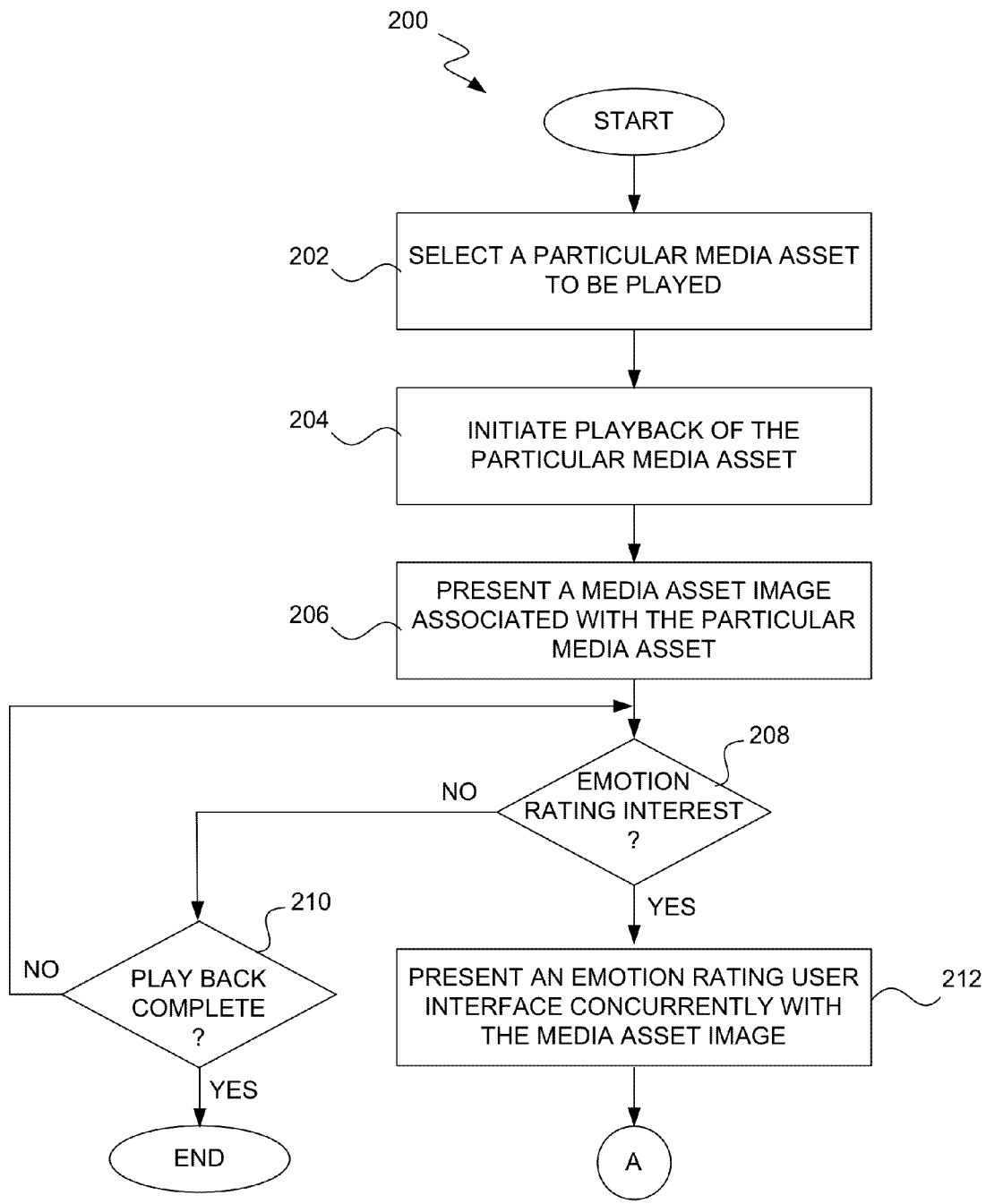
FIGS. 2A and 2B are flow diagrams of an emotion rating process according to one embodiment.
Figure 2B:
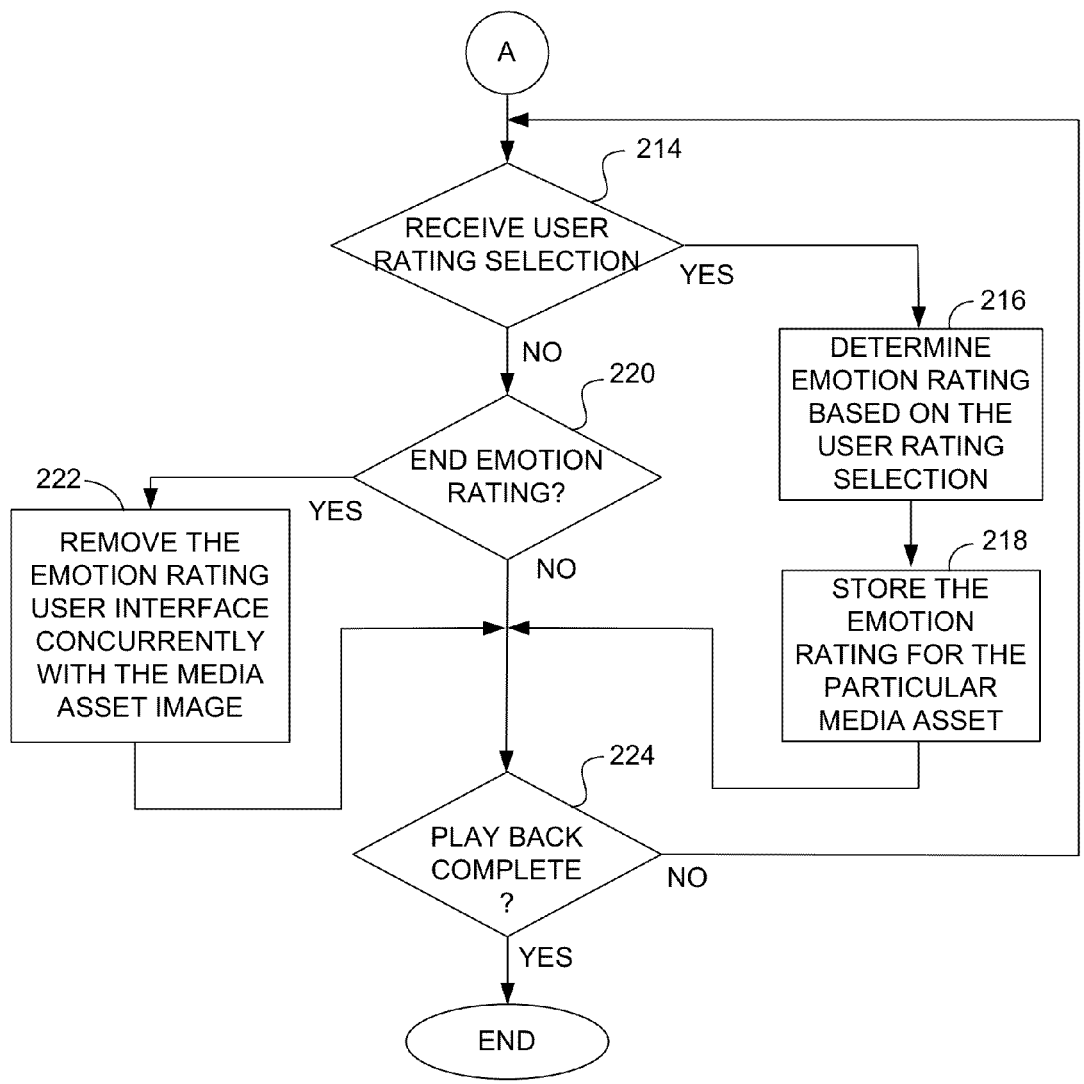

FIGS. 2A and 2B are flow diagrams of an emotion rating process 200 according to one embodiment. The emotion rating process 200 can be performed by an electronic device (e.g., computing device), such as a personal computer, notebook computer, tablet computer or handheld electronic device (e.g. multi-function handheld electronic device, such as a smart phone). The emotion rating process 200 allows a user to determine emotion ratings for media assets while the media assets are being played by an electronic device supporting digital media playback.

The emotion rating process 200 can select 202 a particular media asset to be played. After the particular media asset to be played has been selected 202, playback of the particular media asset can be initiated 204. Additionally, a media asset image associated with the particular media asset can be presented 206. Typically, the electronic device providing the playback of the particular media asset includes or couples to a display device which can display the media asset image while the particular media asset is being played.

Next, a decision 208 determines whether a user of the electronic device has an emotion rating interest. For example, the user can interact with the electronic device (e.g., button or touch input) to indicate an emotion rating interest. For example, the user can interact with a user control (e.g., icon) being displayed to signal an interest in emotion rating. When the decision 208 determines that the user has not designated an emotion rating interest, a decision 210 can determine whether playback of the particular media asset is complete. When the decision 210 determines that playback of the particular media asset is not complete, the emotion rating process 200 can return to repeat the decision 208 and subsequent blocks. Alternatively, when the decision 210 determines that playback of the particular media asset is complete, the emotion rating process 200 is complete and ends.

On the other hand, when the decision 208 determines that the user of the electronic device has designated an emotion rating interest, an emotion rating user interface can be presented 212 on the display device. Typically, the emotion rating user interface is presented 212 concurrently with at least a portion of the media asset image. Consequently, the user of the electronic device is able to provide his/her emotion rating for the particular media asset while the particular media asset is being played.

Once the emotion rating user interface has been presented 212, a decision 214 can determine whether a user rating selection has been received. When the decision 214 determines that a user rating selection has been received, the emotion rating for the particular media assets can be determined 216 based on at least the user rating selection. Then, the emotion rating for the particular media asset can be stored 218. Alternatively, when the decision 214 determines that a user rating selection has not been received, a decision 220 can determine whether an emotion rating should end. When the decision 220 determines that the emotion rating should end, the emotion rating user interface can be removed 222 from being displayed.

Following the block 218, the block 222 or the decision 220 when emotion rating is not to end, a decision 224 can determine whether playback of the particular media asset has completed. When the decision 224 determines that playback of the particular media asset has not completed, the emotion rating process 200 can return to repeat the decision 214 and subsequent blocks. Alternatively, when the decision 224 determines that playback of the particular media asset has completed, the emotion rating process 200 can end.

In general, as shown in FIGS. 2A and 2B, an emotion rating can be performed at an electronic device while a media asset is be provided. However, in other embodiments of the emotion rating process 200, an emotion rating can be performed even though the media asset being emotion rated is not currently being played.

Figure 3A:
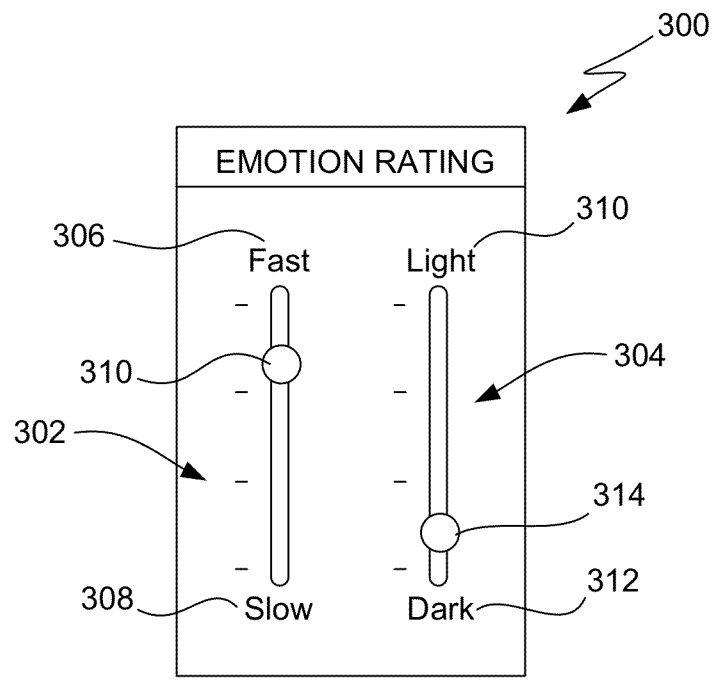
FIG. 3A is a simplified view of an emotion rating graphical user interface (GUI) according to one embodiment.

FIG. 3A is a simplified view of an emotion rating graphical user interface (GUI) 300 according to one embodiment. The emotion rating GUI 300 allows a user to make one or more selections to effect an emotion rating. Typically, the emotion rating is for a particular digital media asset. In one embodiment, the emotion rating is performed or provided by a user while the particular digital media asset is being presented to the user. As shown in FIG. 3A, the emotion rating GUI 300 includes a first user interface control 302 and a second user interface control 304. In one implementation, these user interface controls 302 and 304 can be referred to as sliders or slider bars. By manipulating one or both of the user interface controls 302 and 304, the user is able to set or alter the emotion rating.

The first user interface control 302 includes a fast end 306 and a slow end 308. A movable selector 310 is able to be slid, by the user control, along the first user interface control 302. As a result, the user can move the movable selector 310 either towards the "fast" end 306 or towards the "slow" end 308. As illustrated in FIG. 3A, the movable selector 302 is placed slightly towards the "fast" end 306. As a result, the user has designated that the particular digital media asset associated with the emotion rating feels somewhat "fast" to them.

The second user interface control 304 includes a "bright" end 310 and a "dark" end 312. A movable selector 314 is able to be slid, by the user control, along the second user interface control 304. As a result, the user can move the movable selector 314 either towards the "bright" end 310 or towards the "dark" end 312. As illustrated in FIG. 3A, the movable selector 304 is placed slightly towards the "dark" end 306. As a result, the user has designated that the particular digital media asset associated with the emotion rating feels somewhat "dark" to them.

Figure 3B:
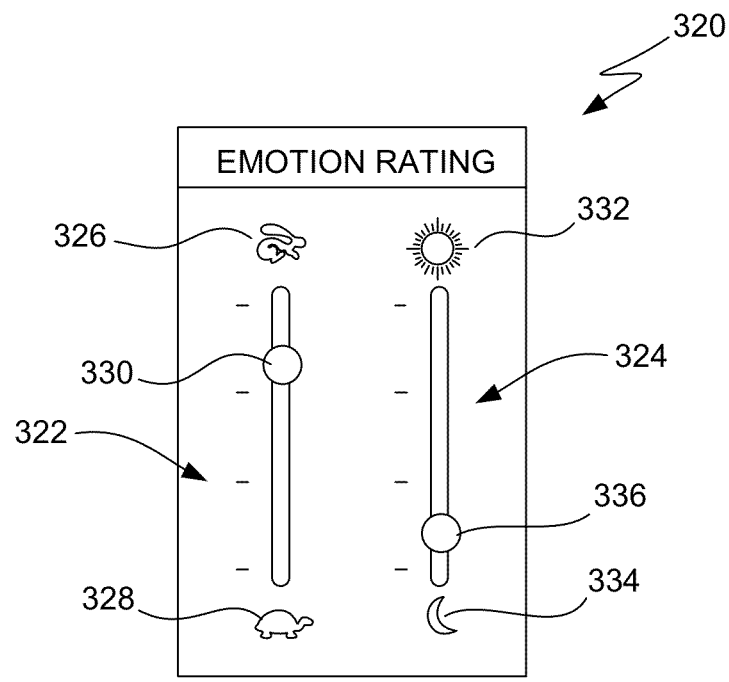
FIG. 3B is a simplified view of an emotion rating graphical user interface (GUI) according to one embodiment.

FIG. 3B is a simplified view of an emotion rating graphical user interface (GUI) 320 according to one embodiment. The emotion rating GUI 320 allows a user to make one or more selections to effect an emotion rating. Typically, the emotion rating is for a particular digital media asset. In one embodiment, the emotion rating is performed or provided by a user while the particular digital media asset is being presented to the user. As shown in FIG. 3B, the emotion rating GUI 300 includes a first user interface control 322 and a second user interface control 324. In one implementation, these user interface controls 322 and 324 can be referred to as sliders or slider bars. By manipulating one or both of the user interface controls 322 and 324, the user is able to set or alter the emotion rating.

The first user interface control 322 includes a fast end 326 and a slow end 328. A movable selector 330 is able to be slid, by the user control, along the first user interface control 322. As a result, the user can move the movable selector 330 either towards the fast end 326 or towards the slow end 328. As illustrated in FIG. 3A, the movable selector 330 is placed slightly towards the fast end 306. As a result, the user has designated that the particular digital media asset associated with the emotion rating feels somewhat "fast" to them.

The second user interface control 324 includes a "light" end 332 and a "dark" end 334. A movable selector 324 is able to be slid, by the user control, along the second user interface control 324. As a result, the user can move the movable selector 336 either towards the "light" end 332 or towards the "dark" end 334. As illustrated in FIG. 3B, the movable selector 336 is placed slightly towards the "dark" end 334. As a result, the user has designated that the particular digital media asset associated with the emotion rating feels somewhat "dark" to them. Although the parameters being used to control the emotion rating are the same in FIGS. 3A and 3B, FIG. 3B utilizes icons, or emotion icons, to represent the parameters being controlled. For example, "fast" is represented by a small image of a rabbit, a "slow" parameter is represented by a small image of a turtle, "light" is represented by a small image of a sun, and "dark" is represented by a small image of a partial moon.

It should be recognized from the examples illustrated in FIGS. 3A and 3B that the number, type and parameter(s) for the user interface controls can vary depending upon implementation. For example, in FIGS. 3A and 3B, there are two user interface controls that can be manipulated by a user to effectuate an emotion rating. The specific types of parameters being controlled can reflect an emotion (e.g., mood, feeling, etc.) that the user receives from a particular digital media asset. Hence, the specific parameters can vary depending upon implementation. In other words, although the parameters of fast/slow and light/dark are used, different embodiments can use different parameters.

Figure 4:
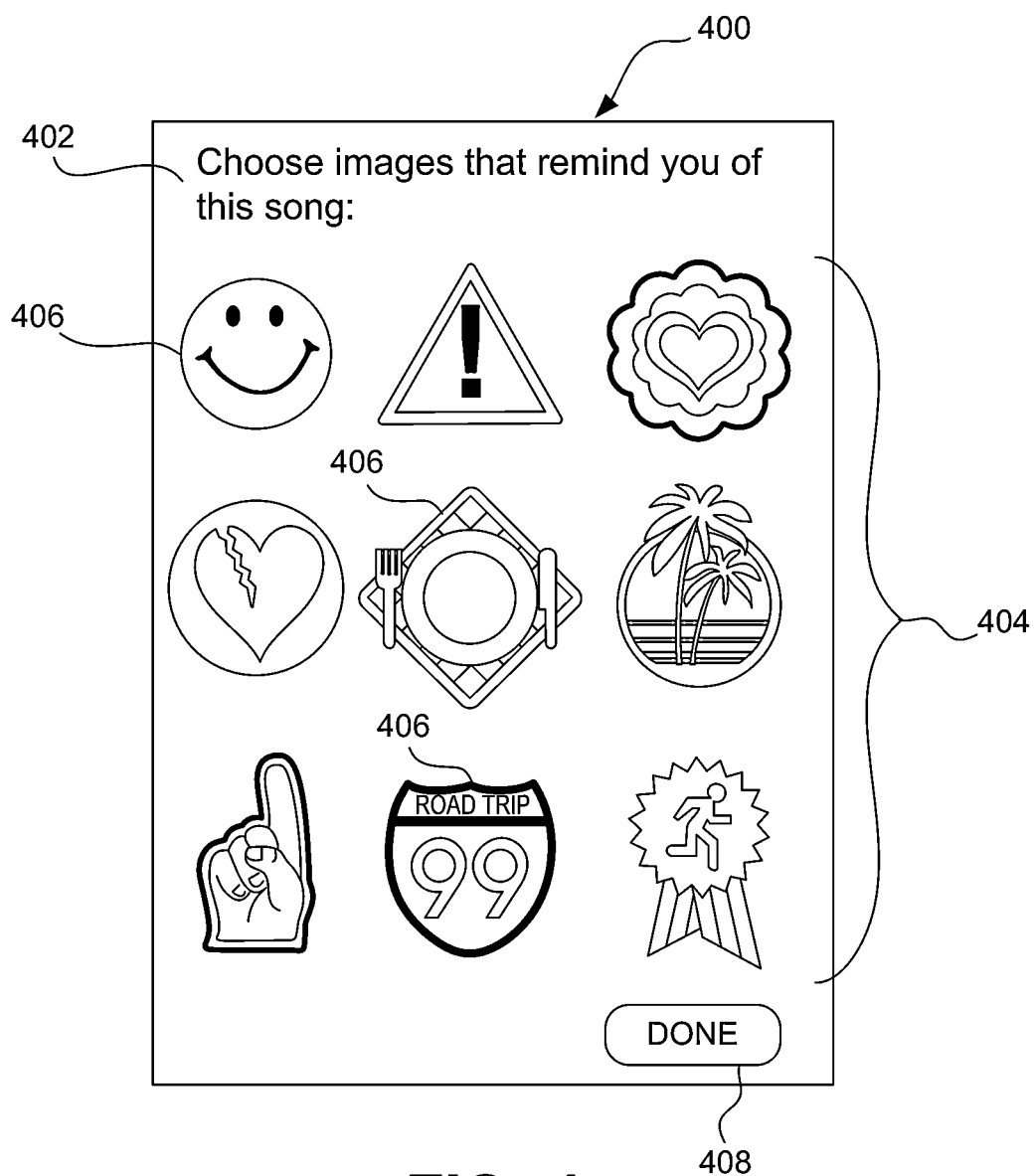
FIG. 4 is a view of an emotion rating graphical user interface (GUI) according to one embodiment.

FIG. 4 is a view of an emotion rating graphical user interface (GUI) 400 according to one embodiment. The emotion rating GUI 400 can be used to allow a user to establish an emotion rating for a digital media asset, such as a song. The emotion rating GUI 400 includes textual instructions 402 that inform the user how to provide an emotion rating. For example, as illustrated in FIG. 4, the textual instructions can specify "choose images that remind you of this song." In addition, the emotion rating GUI 400 can also include an image selection region 404 that provides a plurality of user-selectable images 406. The user is able to select one or more of the user-selectable images 406. For example, if the emotion rating GUI 400 is presented in a touchscreen, then a user can select one or more of the user-selectable images 406 with a touch input. In one embodiment, the meaning of the one or more of the user-selectable images 406 can be user dependent in that they denote an emotion (e.g., feeling) of the user.

Once one or more of the user-selectable images 406 have been selected, the one or more user-selectable images 406 can be visually highlighted or otherwise distinguished. In one embodiment, the visual appearance of the user-selectable images 406 can be predetermined or standard. In another embodiment, the visual appearance of the user-selectable images 406 can be user determined, which can allow a user to customize the visual appearance of the user-selectable images 406. Each of the one or more of the user-selectable images that have been selected can correspond to an emotion that the user associates with the song, which is typically being played when the motion rating is provided by the user. The meanings of the user-selectable images 406 can be subjective to the user. Alternatively, the meaning of the images can be explained, such as by text provided over or adjacent the images, or text available when a cursor or finger hovers over the images.

The emotion rating GUI 400 can also include a done control 408. Upon selection of the done control 408, the user can cause the emotion rating GUI 400 to close (i.e., removed from being displayed). When the emotion rating GUI 400 is subsequently re-opened, the previously designated one or more of the user-selectable images 406 can be visually identified as pertaining to current emotion selections. The user would thereafter be able to unselect any of the previously selected images 406 and/or newly designate additional one or more of the user-selectable images 406.

Figure 5:
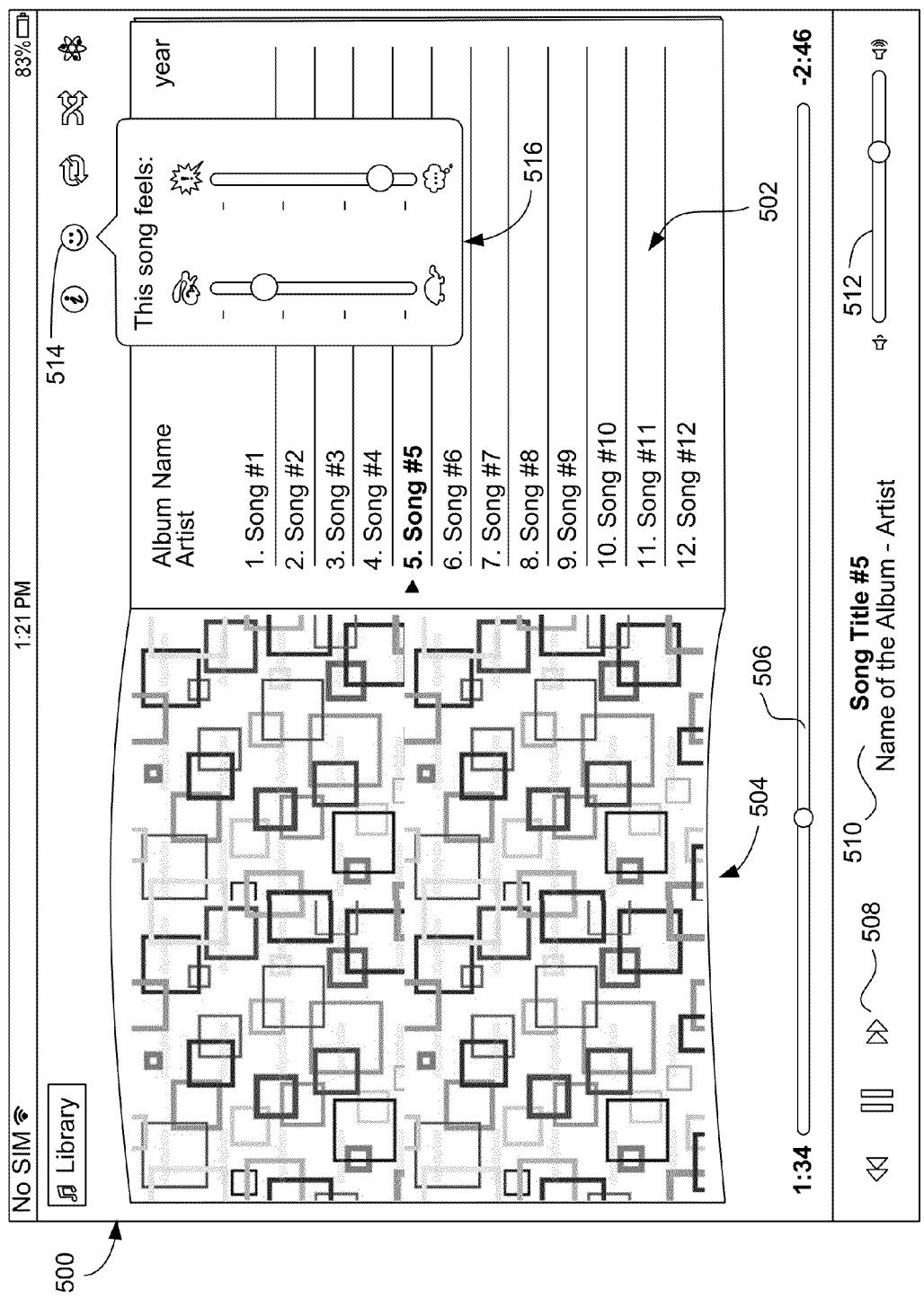
FIG. 5 is an exemplary media playback screen according to one embodiment.

FIG. 5 is an exemplary media playback screen 500 according to one embodiment. The media playback screen 500 can be presented on a display device associated with an electronic device. For example, the electronic device can support a multimedia application that supports playback of digital media assets, such as songs.

The media playback screen 500 includes a song listing region 502 that presents a list of songs. As illustrated, Song #5 in the song list region 502 is selected for playback which is ongoing. The media playback screen 500 also includes an image region 504. The image region 504 can display at least one image (e.g., cover art, poster, video trailer, etc.) associated with the song being played (e.g., Song #5). The media playback screen 500 can also include a playback status bar 506 that illustrates playback position and permits user adjustment to the playback position. Still further, the media playback screen 500 can also include playback controls 508, descriptive song information 510 for the song being played (e.g., title and/or artist/album name), and a volume control 512.

In addition, the media playback screen 500 can include a user-selectable rating control 514, such as an icon, that allows a user to cause an emotion rating GUI 516 to be displayed, such as illustrated in FIG. 5. In one embodiment, the emoting rating GUI 516 can, for example, be implemented as the emotion rating GUI 320 illustrated in FIG. 3B. The user can use the emotion rating GUI 516 to set or alter an emotion rating for the song being played (e.g., Song #5). The emotion rating GUI 516 can be closed when the user is done with the emotion rating GUI 516 (e.g., after the emotion rating has been provided).

Figure 6:
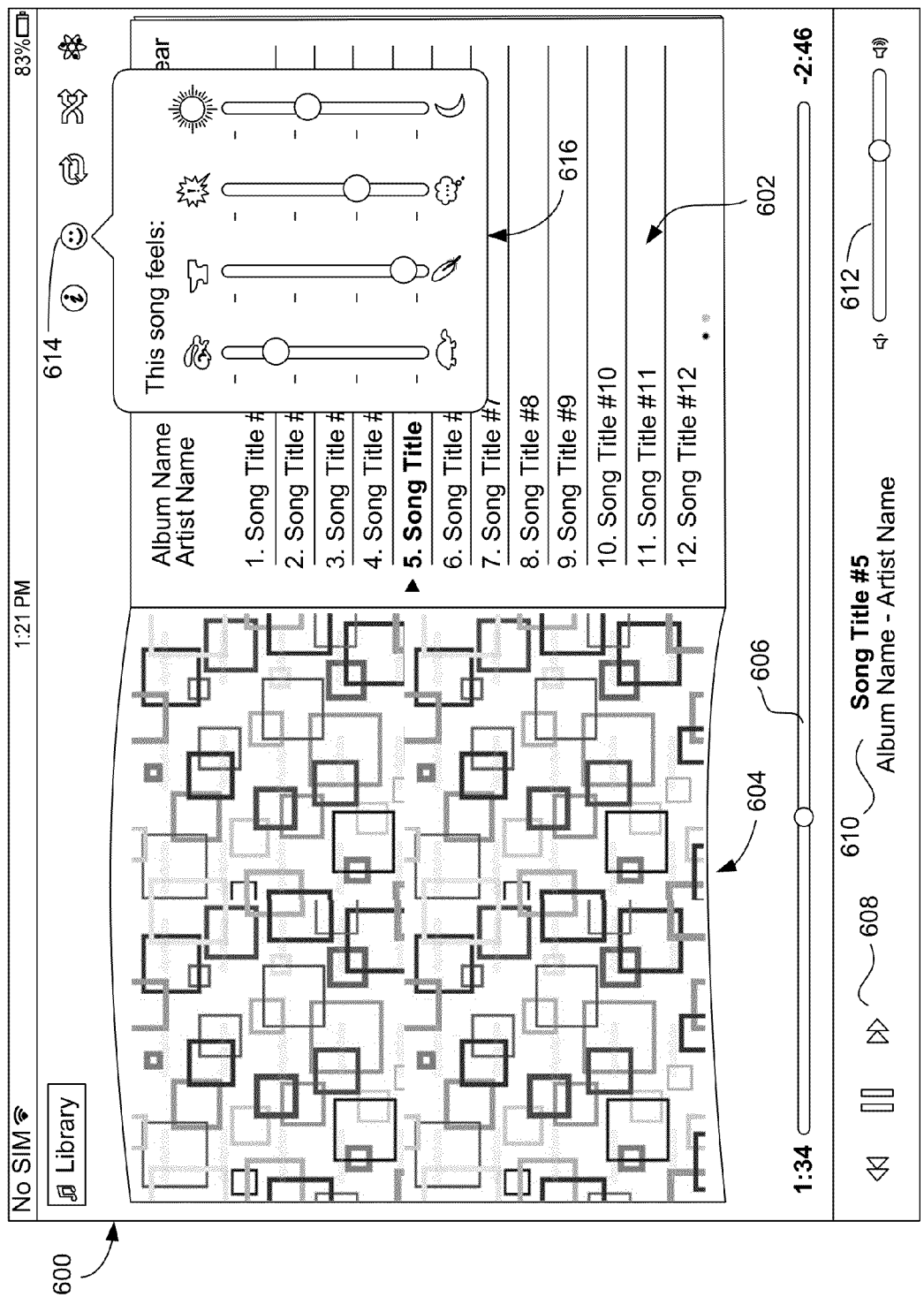
FIG. 6 is an exemplary media playback screen according to another embodiment.

FIG. 6 is an exemplary media playback screen 600 according to another embodiment. The media playback screen 600 can be presented on a display device associated with an electronic device. For example, the electronic device can support a multimedia application that supports playback of digital media assets, such as songs. The electronic device can, for example, be a desktop computer, notebook computer, tablet computer or handheld electronic device (e.g. multi-function handheld electronic device, such as a smart phone).

The media playback screen 600 includes a song listing region 602 that presents a list of songs. As illustrated, Song #5 in the song list region 602 is selected for playback which is ongoing. The media playback screen 600 also includes an image region 604. The image region 604 can display at least one image (e.g., cover art, poster, video trailer, etc.) associated with the song being played (e.g., Song #5). The media playback screen 600 can also include a playback status bar 606 that illustrates playback position and permits user adjustment to the playback position. Still further, the media playback screen 600 can also include playback controls 608, descriptive song information 610 for the song being played (e.g., title and/or artist/album name), and a volume control 612.

In addition, the media playback screen 600 can include a user-selectable rating control 614, such as an icon, that allows a user to cause an emotion rating GUI 616 to be displayed, such as illustrated in FIG. 6. The user can use the emotion rating GUI 616 to set or alter an emotion rating for the song being played (e.g., Song #5). In one embodiment, the emoting rating GUI 616 can, for example, be implemented similar to the GUI emotion rating 320 illustrated in FIG. 3B. However, unlike the GUI emotion rating 320 illustrated in FIG. 3B, the emotion rating GUI 616 includes four (4) user interface controls, which can be manipulated by a user to set or alter the emotion rating. In one embodiment, the four (4) user interface controls can include at least a light-heavy parameter, a fast-slow parameter, an expressive-introspective parameter, and a bright-dark parameter. The emotion rating GUI 616 can be closed when the user is done with the emotion rating GUI 616 (e.g., after the emotion rating has been provided).

Figure 7:
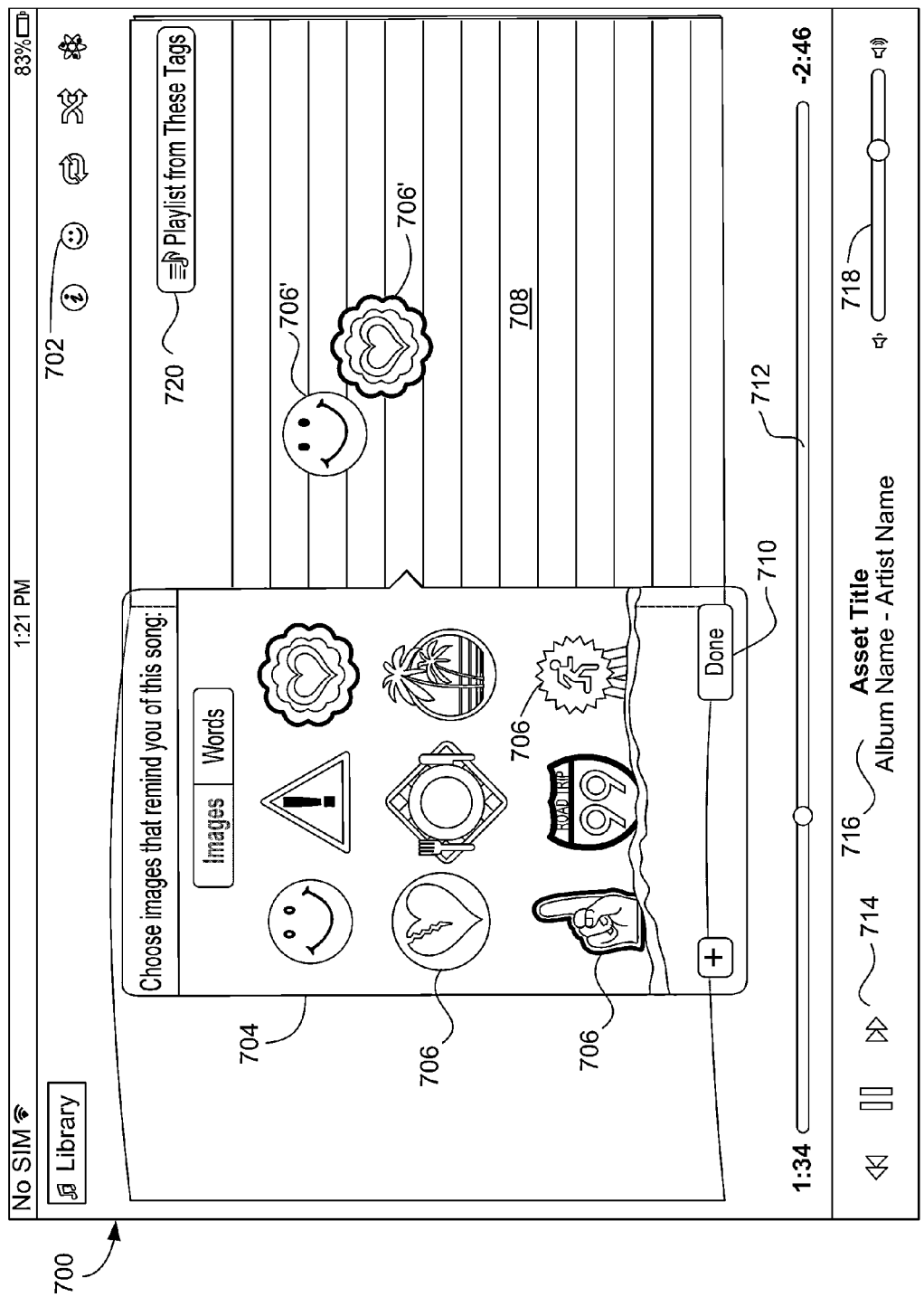
FIG. 7 is an exemplary media playback screen according to one embodiment.

FIG. 7 is an exemplary media playback screen 700 according to one embodiment. The media playback screen 700 can be presented on a display device associated with an electronic device. For example, the electronic device can support a multimedia application that supports playback of digital media assets, such as songs. The electronic device can, for example, be a desktop computer, notebook computer, tablet computer or handheld electronic device (e.g. multi-function handheld electronic device, such as a smart phone).

The media playback screen 700 includes a user-selectable rating control 702, such as an icon, that allows a user to cause an emotion rating GUI 704 to be displayed, such as illustrated in FIG. 7. In one embodiment, the emotion rating GUI 704 can, for example, be implemented as the emotion rating GUI 400 illustrated in FIG. 4. The user can use the emotion rating GUI 704 to set or alter an emotion rating for a digital media asset.

The emotion rating GUI 704 provides a plurality of user-selectable images 706. The user is able to select one or more of the user-selectable images 706. For example, if the emotion rating GUI 700 is presented by a touchscreen, then a user can select one or more of the user-selectable images 706 with a touch input. In one embodiment, the meaning of the one or more of the user-selectable images 706 can be user dependent in that they denote an emotion (e.g., feeling) of the user. The meanings of the user-selectable images 706 can be subjective to the user. Alternatively, the meaning of the images can be explained, such as text by being provided over or adjacent the images, or text available when a cursor hovers over the images.

Once one or more of the user-selectable images 706 have been selected, the one or more selected user-selectable images 706 can also be placed in an emotion selection area 708. In one embodiment, the selected one or more user-selectable images 706 can be placed in the emotion selection area 708 with a drag and drop operation. For example, as shown in FIG. 7, the emotion selection area 708 can include those of the selected user-selectable images 706' have been so placed.

Once one or more of the user-selectable images 706 have been selected, the one or more user-selectable images 706 can also be visually highlighted or otherwise distinguished. In one embodiment, the visual appearance of the user-selectable images 706 can be predetermined or standard. In another embodiment, the visual appearance of the user-selectable images 706 can be user determined, which can allow a user to customize the visual appearance of the user-selectable images 706.

The emotion rating GUI 704 can also include a done control 710. Upon selection of the done control 710, the user can cause the emotion rating GUI 704 to close (i.e., removed from being displayed). When the emotion rating GUI 704 is subsequently re-opened, the previously designated one or more of the user-selectable images 706 can be displayed in the emotion selection area 708 and can be visually identified as pertaining to current emotion selections. The user would thereafter be able to unselect any of the previously selected images 706 and/or newly designate additional one or more of the user-selectable images 706.

The media playback screen 700, although not shown, can include a song listing region that presents a list of songs (e.g., song listing area 502). The media playback screen 700 also includes an image region (e.g., image region 504). The image region can display at least one image (e.g., cover art, poster, video trailer, etc.) associated with the song being played. The media playback screen 700 can also include a playback status bar 712 that illustrates playback position and permits user adjustment to the playback position. Still further, the media playback screen 700 can also include playback controls 714, descriptive asset information 716 for the digital asset being played (e.g., title and/or artist/album name), and a volume control 718.

Figure 8:
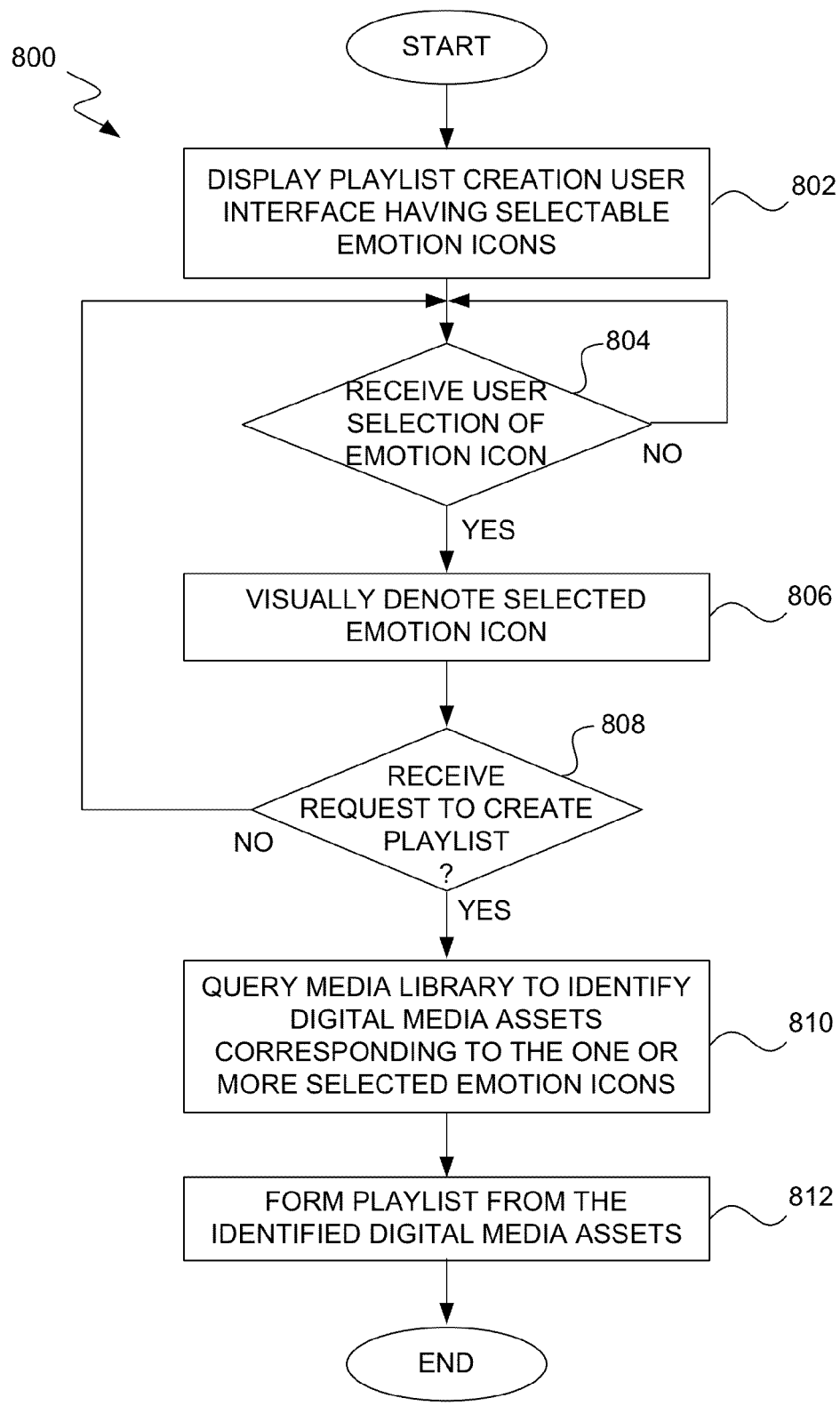
FIG. 8 is a flow diagram of a playlist creation process according to one embodiment.

FIG. 8 is a flow diagram of a playlist creation process 800 according to one embodiment. The playlist creation process 800 can be performed by an electronic device (e.g., computing device), such as a personal computer, notebook computer, tablet computer or handheld electronic device (e.g. multi-function handheld electronic device, such as a smart phone).

The playlist creation process 800 can initially display a playlist creation user interface having selectable emotion icons. The user is able to interact with the playlist creation user interface to select one or more of the selectable emotion icons that represent characteristics that the user desires in a playlist that is being created for the user. After the playlist creation user interface has been displayed, a decision 804 can determine whether a user selection of one of the selectable emotion icons has been received. When the decision 804 determines that a user selection of one of the selectable emotion icons has not yet been received, the playlist creation process 800 can await such a selection. Once the decision 804 determines that a user selection of one of the selectable emotion icons has been received, the selected emotion icons can be visibly denoted in the playlist creation user interface. For example, the selected emotion icon can be highlighted by a color or brightness change or by placing a visual indicator around the selected emotion icon (e.g. a bounding box around the selected emotion icon).

Next, decision 808 can determine whether a request to create a playlist has been received. Here, in one embodiment, the playlist creation user interface can include a user control (e.g., "create playlist" soft or touch button) that allows the user to specify when it desires to create a playlist using the one or more previously selected emotion icons. When the decision 808 determines that a request to create a playlist has not yet been received, the playlist creation process 800 can return to repeat the decision 804 and subsequent blocks so that additional or different emotion icons can be selected.

Alternatively, when the decision 808 determines that a request to create a playlist has been received, a media library can be queried 810 to identify those digital media assets corresponding to the one or more selected emotion icons. Here, the media library can include, reference or be associated with a media database. The media database can be queried to identify the digital media assets within the media library that correspond to the one or more selected emotion icons. Here, to the extent that the digital media assets within the media library have been previously "tagged" to have emotion ratings, these emotion readings can be used to identify those of the digital media assets in the media library that corresponds to the one or more selected emotion icons. Following the identification of the digital media assets that correspond to the one or more selected emotion icons, a playlist can be formed 812 from the identified digital media assets. Following the block 812, the playlist creation process 800 can end since the playlist has been formed.

Figure 9:
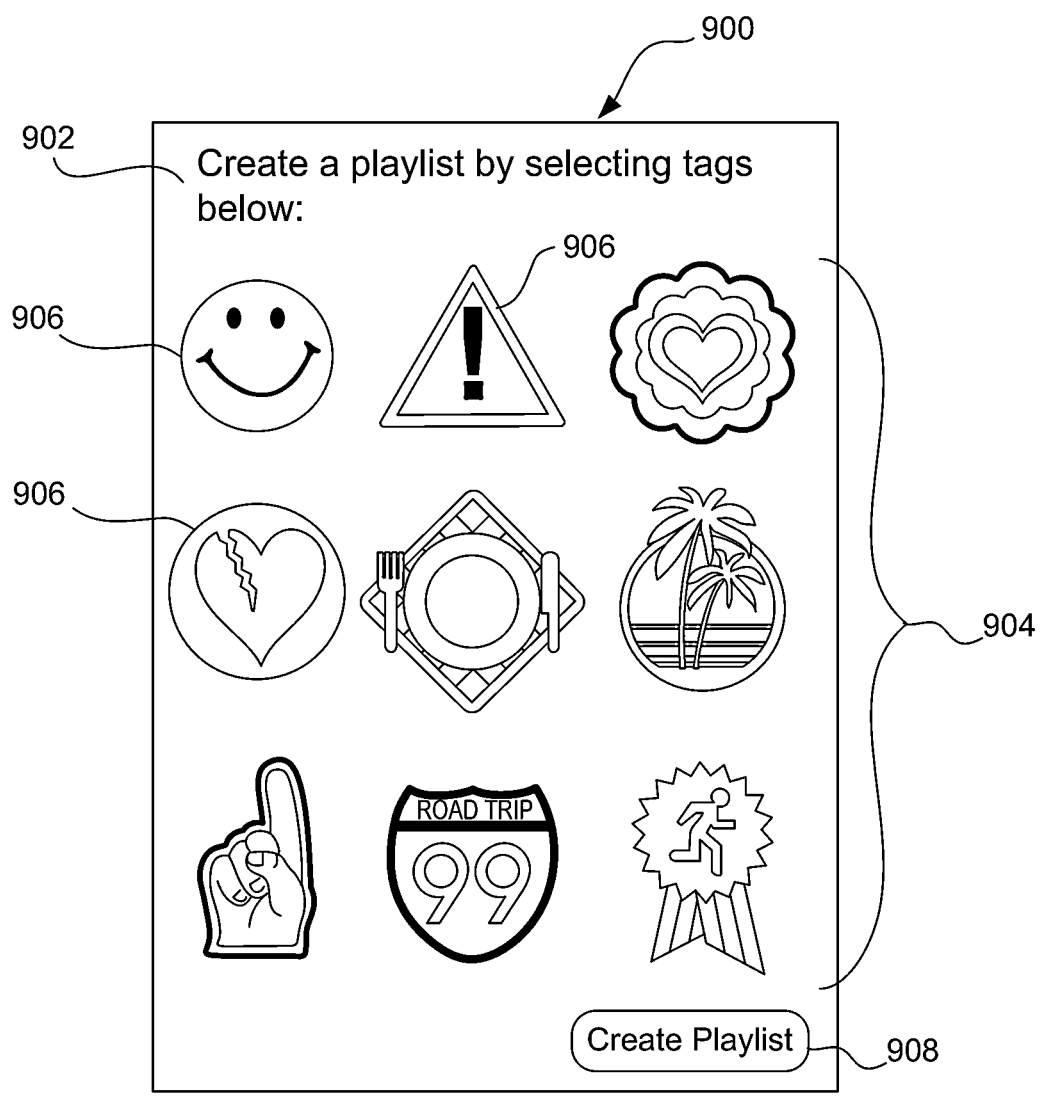
FIG. 9 is a view of a playlist creation graphical user interface (playlist creation GUI) according to one embodiment.

FIG. 9 is a view of a playlist creation graphical user interface (playlist creation GUI) 900 according to one embodiment. The playlist creation GUI 900 can be used to allow a user to create a playlist using characteristics associated with emotion ratings. The playlist can include a plurality of digital media assets, such as songs. The playlist creation rating GUI 900 includes textual instructions 902 that inform the user to select one or more tags. For example, as illustrated in FIG. 9, the textual instructions can specify "create a playlist by selecting tags below." In addition, the playlist creation GUI 900 can also include a tag selection region 904 that provides a plurality of user-selectable tags 906. The user-selectable tags 906 can be presented in the playlist creation GUI 900 as graphical images (e.g., icons). The user-selectable tags 906 are able to be selected by a user. For example, if the playlist creation GUI 900 is presented in a touchscreen, then a user can select one or more of the user-selectable tags 906 with a touch input. In one embodiment, the meaning of the one or more of the user-selectable tags 906 is user dependent in that they denote an emotion or feeling of the user.

Once one or more of the user-selectable tags 906 have been selected, the one or more user-selectable tags 906 can be visually highlighted or otherwise distinguished. In one embodiment, the visual appearance of the user-selectable tags 906 can be predetermined or standard. In another embodiment, the visual appearance of the user-selectable tags 906 can be user determined, which can allow a user to customize the visual appearance of the user-selectable tags 906. Each of the one or more of the user-selectable tags that have been selected can correspond to an emotion (e.g., feeling) that the user associates with the song, which is typically being played when the emotion rating is provided by the user. The meanings of the user-selectable tags 906 can be subjective to the user. Alternatively, the meaning of the images can be explained, such as by text provided over or adjacent the images, or text available when a cursor or finger hovers over the images.

The playlist creation GUI 900 can also include a create playlist control 908. Upon selection of the create playlist control 908, the user can cause the playlist creation GUI 900 to form a playlist in accordance with the one or more user-selectable tags 906 that have been selected. Since the user-selectable tags 906 are premised on emotions, the playlist created is associated with the emotions associated with the one or more user-selectable tags 906 that have been selected. Thereafter, the playlist can be presented (e.g., displays) for the user and the playlist creation GUI 900 can close (i.e., removed from being displayed).

Figure 10:
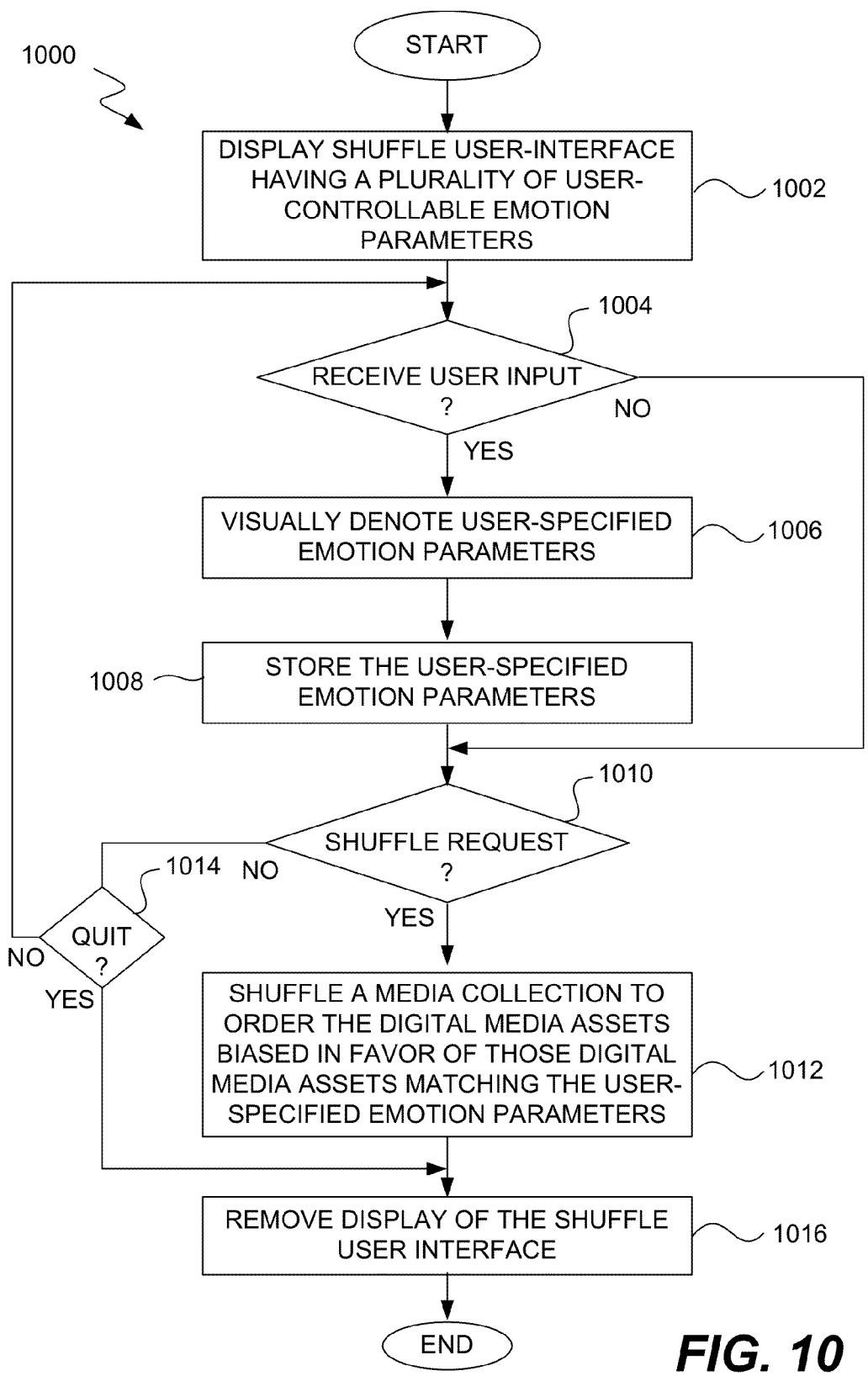
FIG. 10 is a flow diagram of a shuffle process according to one embodiment.

FIG. 10 is a flow diagram of a shuffle process 1000 according to one embodiment. The shuffle process 1000 can be performed by an electronic device (e.g., computing device), such as a personal computer, notebook computer, tablet computer or handheld electronic device (e.g. multi-function handheld electronic device, such as a smart phone).

The shuffle process 1000 can display 1002 a shuffle user interface having a plurality of user-controllable emotion parameters. After the shuffle user interface has been displayed 1002, a decision 1004 can determine whether a user input has been received. When the decision 1004 determines that a user input with respect to the shuffle user interface has been received, the one or more emotion parameters specified by the user input can be visually designated 106. The visual designation can be provided using one or more of color, brightness, or graphical attribute applied to or adjacent the representation for the user-specified emotion parameters. In one embodiment, the shuffle user interface can display the user-controllable emotion parameters as selectable emotion icons as discussed above. In general, the shuffle user interface can provide a graphical representation pertaining to a single emotion parameter, a plurality of emotion parameters, or an aggregate effect of a plurality of emotion parameters. The shuffle process 1000 can also operate to store 1008 the user-specified emotion parameters. By storing the user-specified emotion parameters, the default settings for the shuffle process 1000 can be maintained and utilized with subsequent shuffle actions, unless the user operates to alter the emotion parameters.

Following the block 1008, as well as following the decision 1004 if a user input with respect to the shuffle user interface has not been received, a decision 1010 can determine whether a smart shuffle request has been made. In one embodiment, the shuffle user interface includes a user-selectable control that can be activated by the user to initiate a shuffle request. In any case, when the decision 1010 determines that a shuffle request has been received, a media collection can be shuffled 1012 to order the digital media assets biased in favor of those of the digital media assets that match the user-specified emotion parameters.

Alternatively, when the decision 1010 determines that a smart shuffle request has not been received, a decision 1014 determines whether the shuffle process should quit. If the decision 1014 determines that the shuffle process 1000 should not quit, the shuffle process 1000 returns to repeat the decision 1004 and subsequent blocks so that additional user input can be received and processed. On the other hand, when the decision 1014 determines that the shuffle process 1000 should quit, as well as directly following the block 1012, the shuffle process 1000 can end. However, before doing so, the display of the shuffle user interface can be removed 1016.

Figure 11:
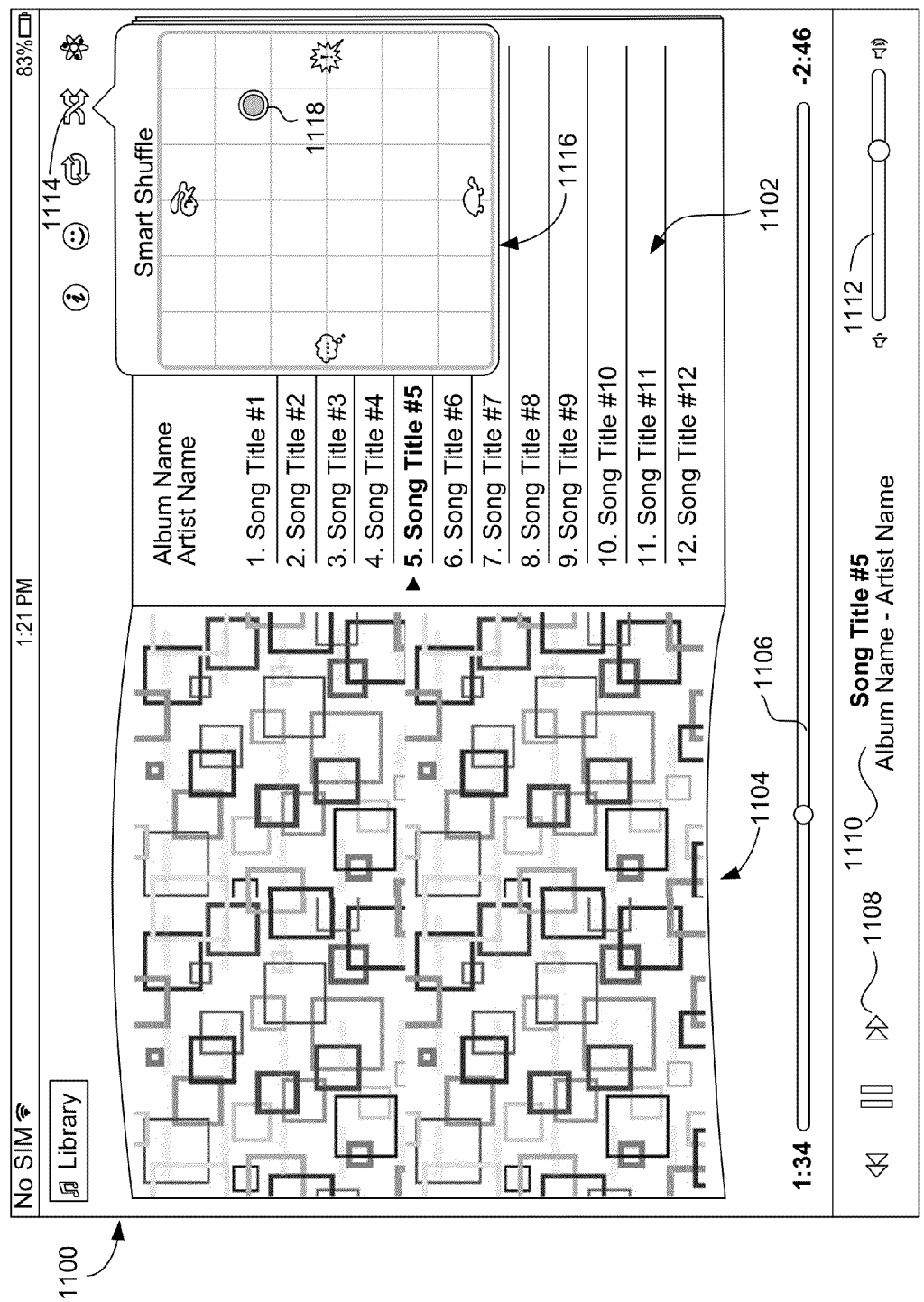
FIG. 11 is an exemplary media playback screen according to one embodiment.

FIG. 11 is an exemplary media playback screen 1100 according to one embodiment. The media playback screen 1100 can be presented on a display device associated with an electronic device. For example, the electronic device can support a multimedia application that supports playback of digital media assets, such as songs. The electronic device can, for example, be a desktop computer, notebook computer, tablet computer or handheld electronic device (e.g. multi-function handheld electronic device, such as a smart phone).

The media playback screen 1100 includes a song listing region 1102 that presents a list of songs. As illustrated, Song #5 in the song list region 1102 is selected for playback which is ongoing. The media playback screen 1100 also includes an image region 1104. The image region 1104 can display at least one image (e.g., cover art, poster, video trailer, etc.) associated with the song being played (e.g., Song #5). The media playback screen 1100 can also include a playback status bar 1106 that illustrates playback position and permits user adjustment to the playback position. Still further, the media playback screen 1100 can also include playback controls 1108, descriptive song information 1110 for the song being played (e.g., title and/or artist/album name), and a volume control 1112.

In addition, the media playback screen 1100 can include a user-selectable rating control 1114, such as a visual representation of an icon, that allows a user to cause an emotion rating GUI 1116 to be displayed, such as illustrated in FIG. 11. The user can use the emotion rating GUI 1116 to set or alter an emotion rating for the song being played (e.g., Song #5). The emotion rating GUI 1116 can include a rating indicator 1118 that can be positioned (by a user) in a two-dimensional arrangement of a plurality of emotion parameters (which can be represented by graphical representations (e.g., icons). The position of the rating indicator 1118 influences the plurality of emotion parameters. In FIG. 11, the two-dimensional arrangement has four sides, and each side has an associated emotion parameter. As one example, the two-dimensional arrangement has a fast parameter at a first side, a slow parameter at a side opposite the first side, an expressive parameter at a second side, and an introspective parameter at a side opposite the second side. The emotion rating GUI 1116 can be closed when the user is done with the emotion rating GUI 516 (e.g., after the emotion rating has been provided).

In view of the foregoing, it will readily be known that an electronic device provided in accordance with one or more embodiments can, for example, be a computing device (e.g., desktop computer, notebook computer, tablet computer), mobile phone (e.g., cellular phone, smart phone), personal digital assistant (PDA), media player (e.g., music, videos, games, images), and/or the like. An electronic device may also be a multi-functional device that combines two or more of these device functionalities into a single device. A portable electronic device may support various types of network communications.

A portable electronic device can be provided as a hand-held electronic device. The term hand-held can generally refer to an electronic device with a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

Figure 12:
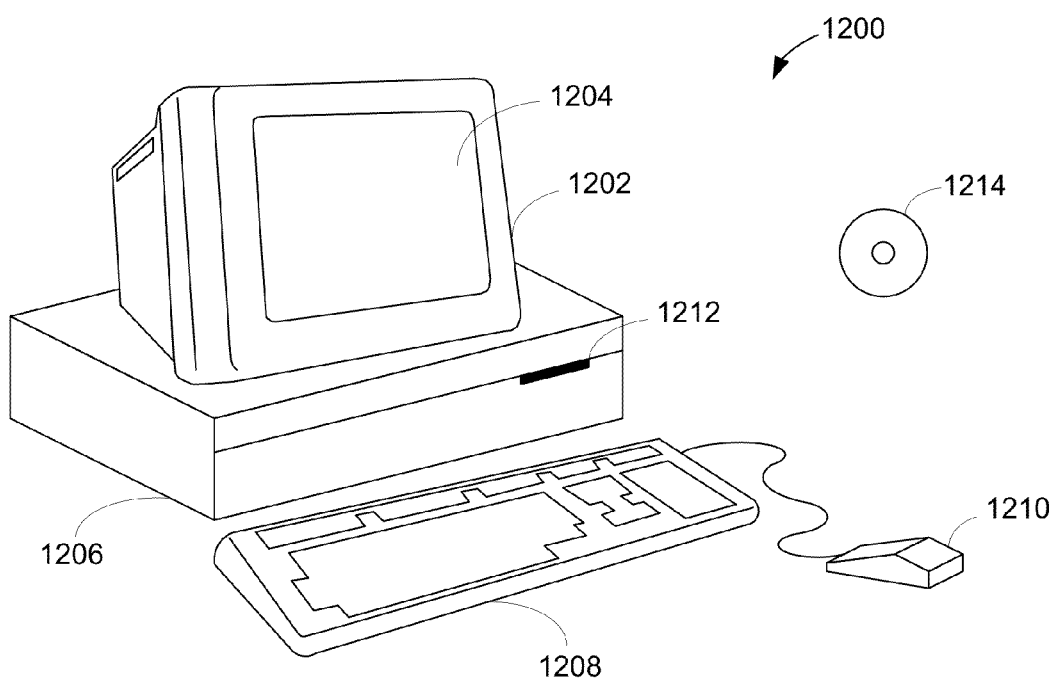
FIG. 12 shows an exemplary computer system suitable for use with at least one embodiment of the invention.

FIG. 12 shows an exemplary computer system 1200 suitable for use with at least one embodiment. The methods, processes and/or graphical user interfaces discussed above can be provided by a computer system. The computer system 1200 can include a display monitor 1202 having a single or multi-screen display 1204 (or multiple displays), a cabinet 1206, a keyboard 1208, and a mouse 1210. The mouse 1210 is representative of one type of pointing device. The cabinet 1206 houses a processing unit (or processor), system memory and a hard drive (not shown). The cabinet 1206 also houses a drive 1212, such as a DVD, CD-ROM or floppy drive. The drive 1212 can also be a removable hard drive, a Flash or EEPROM device, etc. Regardless, the drive 1212 may be utilized to store and retrieve software programs incorporating computer code that implements some or all aspects of the embodiments described above. Although CD-ROM 1214 is shown as an exemplary computer readable storage medium, other computer readable storage media including floppy disk, tape, Flash or EEPROM memory, memory card, system memory, and hard drive may be utilized. In one implementation, a software program for the computer system 1200 is provided in the system memory, the hard drive, the drive 1212, the CD-ROM 1214 or other computer readable storage medium and serves to incorporate the computer code that implements some or all aspects of the embodiment described above.

The emotion rating discussed herein is application for use to digital assets, in general. The digital assets can, for example, pertain to musical songs, movies, videos, games, or computer application programs. In some embodiment, the digital assets are media based and can be referred to as digital media assets. The digital media assets can, for example pertain to video items (e.g., video files or movies), audio items (e.g., audio files or audio tracks, such as for songs, musical albums, podcasts or audiobooks), or image items (e.g., photos). Games and computer application programs having media aspects can also be considered digital media aspects.

The various aspects, features, embodiments or implementations of the invention described above can be used alone or in various combinations.

Embodiments of the invention can be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

In general, the steps associated with the methods of the present invention may vary widely. Steps may be added, removed, altered, combined, and reordered without departing from the spirit or the scope of the present invention.

While this specification contains many specifics, these should not be construed as limitations on the scope of the disclosure or of what may be claimed, but rather as descriptions of features specific to particular embodiment of the disclosure. Certain features that are described in the context of separate embodiments may also be implemented in combination. Conversely, various features that are described in the context of a single embodiment may also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of rating digital media assets, the method comprising:
   identifying a digital media asset to be rated;
   presenting an emotion rating user interface on a display device;
   receiving at least one user selection via the emotion rating user interface to set an emotion rating for the digital media asset;
   tagging the digital media asset with the emotion rating; and
   storing the tagged digital media asset.

2. A method as recited in claim 1, wherein the identifying comprises:
   playing the digital media asset; and
   presenting a media asset image associated with the digital media asset on the display device.

3. A method as recited in claim 2, wherein the emotion rating user interface is displayed concurrently with the media asset image.

4. A method as recited in claim 1, wherein the emotion rating user interface includes a plurality of user-selectable controls, each of the user-selectable controls enables the user to influence the emotion rating.

5. A method as recited in claim 1,
   wherein the emotion rating comprises a set of emotion parameters, and
   wherein the emotion rating user interface includes a plurality of user-selectable controls, each of the user-selectable controls enables the user to set or alter one or more of the emotion parameters.

6. A method as recited in claim 5, at least one of the plurality of user-selectable controls includes at least one slider control, wherein the user can manipulate the slider control to set or alter the one of more of the emotion parameters.

7. A method as recited in claim 5, wherein the set of emotion parameters includes at least a light-heavy parameter and a fast-slow parameter.

8. A method as recited in claim 5, wherein the set of emotion parameters includes at least: a light-heavy parameter, a fast-slow parameter, an expressive introspective parameter, and a bright-dark parameter.

9. A method as recited in claim 1, wherein the emotion rating comprises a set of emotion parameters.

10. A method as recited in claim 9, wherein the set of emotion parameters includes at least a light-heavy parameter and a fast-slow parameter.

11. A method as recited in claim 9, wherein the set of emotion parameters includes at least one of a light-heavy parameter, a fast-slow parameter, an expressive-introspective parameter, or a bright-dark parameter.

12. A method as recited in claim 1, wherein each of the emotion parameters are able to be set or altered via the emotion rating user interface, and wherein each of the emotion parameters are represented in the emotion rating user interface by a graphical component.

13. A method as recited in claim 12, wherein the graphical component comprises a graphical icon.

14. A non-transitory computer readable medium including at least computer program code stored thereon for rating digital media assets, the non-transitory computer readable medium comprising:
   computer program code for identifying a particular media asset to be rated;
   computer program code for presenting an emotion rating user interface on a display device associated with the electronic device;
   computer program code for receiving at least one user selection via the emotion rating user interface to set an emotion rating for the particular media asset;
   computer program code for tagging the digital media asset with the emotion rating; and
   computer program code for storing, in data storage of the electronic device, the tagged digital media asset.

15. A non-transitory computer readable medium including at least computer program code stored thereon for creating a playlist of digital media assets suitable for playback on an electronic device, the non-transitory computer readable medium comprising:
   computer program code for presenting a playlist creation user interface on a display device associated with the electronic device, the playlist creation user interface having selectable emotion icons;
   computer program code for receiving one or more selections of the selectable emotion icons;
   computer program code for receiving a request to create a playlist in accordance with the one or more selections of the selectable emotion icons;
   computer program code for querying a media library to identify a set of digital media assets that correspond to the one or more selections of the selectable emotion icons; and
   computer program code for forming the playlist from the identified set of digital media assets.

16. A non-transitory computer readable medium as recited in claim 15, wherein the computer readable medium comprises:
   computer program code for storing the playlist in data storage of the electronic device.

17. A non-transitory computer readable medium as recited in claim 15, wherein the computer readable medium comprises:
   computer program code for playing the playlist at the electronic device.

18. A non-transitory computer readable medium as recited in claim 15, wherein the computer readable medium comprises:
   computer program code for visually designating the one or more selections of the selectable emotion icons on the playlist creation user interface as the selections are made.

19. A method of shuffling a collection of digital media assets prior to subsequent playback of the collection at an electronic device, the method comprising:
   presenting a shuffle user interface on a display device associated with the electronic device, the shuffle user interface having a plurality of user-controllable emotion parameters;
   receiving a user input regarding at least one of the user-controlled emotion parameters;
   visually designating the at least one of the user-controlled emotion parameters;
   storing the at least one of the user-controlled emotion parameters;
   subsequently receiving a shuffle request; and
   shuffling the collection to order the digital media assets in the collection according to the designated at least one user-controlled emotion parameter, where the digital media assets in the collection are tagged with emotion parameters.

20. A non-transitory computer readable medium as recited in claim 19, wherein the computer readable medium comprises:
   computer program code for playing the digital media assets as ordered by the shuffled media collection at the electronic device.

* * * * *

UNITED STATES PATENT AND TRADEMARK OFFICE
CERTIFICATE OF CORRECTION

| | | |
|---|---|---|
| PATENT NO. | : 8,819,577 B2 | Page 1 of 1 |
| APPLICATION NO. | : 13/249084 | |
| DATED | : August 26, 2014 | |
| INVENTOR(S) | : Jorge S. Fino | |

It is certified that error appears in the above-identified patent and that said Letters Patent is hereby corrected as shown below:

In the Claims

Column 16, Line 43 at Claim 20; replace:
"20. A non-transitory computer readable medium as recited" with
-- 20. A method as recited --

Column 16, Line 44 at Claim 20; replace:
"in claim 19, wherein the computer readable medium com-" with
-- in claim 19, wherein the method com- --

Signed and Sealed this
Seventeenth Day of February, 2015

Michelle K. Lee
*Deputy Director of the United States Patent and Trademark Office*